United States Patent [19]

Staley et al.

[11] 4,230,296
[45] Oct. 28, 1980

[54] HOLDING DEVICE FOR HUNTING EQUIPMENT

[76] Inventors: Gary M. Staley, 6708 Cliftwood, Evansville, Ind. 47712; Monty S. Cox, R.R. 1, Box 161B, Rucker Rd., Henderson, Ky. 42420

[21] Appl. No.: 13,143

[22] Filed: Feb. 21, 1979

[51] Int. Cl.³ .............................................. A47F 5/00
[52] U.S. Cl. .............................. 248/309 R; 248/218.4
[58] Field of Search .............. 248/309, 176, 110, 231, 248/230, 219.4, 219.1, 218.4; 211/60 T, 6 S; 182/222

[56] References Cited

U.S. PATENT DOCUMENTS

| | | | |
|---|---|---|---|
| 1,432,206 | 10/1922 | Poole | 248/110 UX |
| 1,535,978 | 4/1925 | Baker | 248/231 X |
| 1,826,120 | 10/1931 | Booth | 182/222 |
| 2,221,801 | 11/1940 | Keppinger | 211/66 UX |
| 2,348,902 | 5/1944 | Hart | 248/110 UX |
| 3,256,872 | 6/1966 | Koser | 124/23 |
| 3,633,860 | 1/1972 | Navarro | 211/65 X |
| 3,797,790 | 3/1974 | Iseki | 248/230 |

FOREIGN PATENT DOCUMENTS

| | | | |
|---|---|---|---|
| 627021 | 11/1963 | Belgium | 248/309 |
| 151455 | 3/1903 | Fed. Rep. of Germany | 248/231 |
| 1164123 | 9/1969 | United Kingdom | 248/309 |

Primary Examiner—J. Franklin Foss
Attorney, Agent, or Firm—Woodard, Weikart, Emhardt & Naughton

[57] ABSTRACT

A holding device for hunting implements and similar items include a substantially flat unitary member having a main body portion and oppositely disposed tab portions joined to the main body portion and extending outwardly from a common edge so as to define a generally rectangular slot therebetween. This generally rectangular slot is of sufficient width and thickness so as to be able to receive a bow such that the bow may be held in an upright position when the holding device is suitably attached to a tree stand or similar structural member. The inner facing edges of this slot are lined with a nonslip synthetic material such that the bow is retained in a wedging action and may be both easily inserted as well as quickly removed. A clearance hole is provided off of the centerline of the holding device for attachment to a tree stand, and by means of suitable threaded fasteners, the holding device may be oriented in a use position as well as pivoted to a stowed position when not in use. An alternative form of this holding device includes a plurality of adjacent and overlapping circular openings such that the same concept may be utilized for a rifle in lieu of a bow.

7 Claims, 8 Drawing Figures

HOLDING DEVICE FOR HUNTING EQUIPMENT

BACKGROUND OF THE INVENTION

This patent application pertains in general to hunting devices and in particular to implements for holding hunting equipment in a ready-for-use position.

A great deal of hunting is done by the hunter walking through fields and woods such that it is the hunter's movement which flushes the game from its hiding place and enables the hunter to realize a clear shot. Typical types of game usually sought by this method include quail and rabbits, among others, and although such hunters typically use rifles or shotguns, there is no reason other than possibly the size of the game being sought that the hunters could not also use bows and arrows. One aspect of this method of hunting is that the hunters normally carry their hunting equipment such as their rifles in their hand and arm in a somewhat ready-for-use position such that once game is flushed from its hiding place, the hunting equipment can be brought into a firing position very quickly. There is, however, another type of hunting in which the hunter conceals himself either in ground cover such as a thicket, or within a tree and waits for game to approach. This type of hunting requires a great deal more patience on the part of the hunter because quietness and lack of movement are critical determinants as to whether or not the particular game being sought will approach within a close enough radius for firing or will be scared away by some errant movement or sound. One example of this type of hunting is the use of a duck blind situated within the shoreline brush and reeds of a pond or lake such that duck and geese may approach within a close enough distance for accurate firing without being aware of the presence of the hunters.

Very often individuals who hunt deer using a bow and arrows will station themselves up in a tree and utilize a tree stand in order to provide a suitable platform on which to rest while they wait for the deer to approach. While it is true that tree stands are old in the art, such stands are not provided with suitable holding devices so that the hunting equipment being used by the hunter can be rested in a somewhat ready-for-use position so that the hunter will not have to hold this equipment while he waits patiently for the game. However, once game such as the deer is spotted, a further requirement of a suitable holding device is that it release the particular item of hunting equipment quickly so that the hunter can orient the equipment in a firing position.

Within the prior art are a variety of holder devices for bows and the Saunders bow holder is one example. This type of bow holder includes a vinyl-covered U-shaped member with a threaded stem extending from the base of the U. This particular holder is utilized by screwing the threaded stem into a tree trunk or limb utilizing a pair of these holders such that the bow can be supported and oriented in a ready-for-use position. The disadvantage with this type of design is that many states have outlawed devices which dig into the trees because of the obvious damage that they can cause. The specific bow holder referred to is offered by Saunders Archery Company of Columbus, Nebraska.

Another device with a different structure, although a related purpose, is a model number 3002 distributed by Precision Shooting Equipment Company. This model number refers to an Apache bow holder and is designed to attach to an Apache tree stand. This Apache bow holder utilizes a block construction with a series of outwardly extending pegs which are perpendicular to the surface of the block from which they extend and provide a wedging type of action for the bow such that it can be retained in close proximity to the tree stand. A clamp and wing nut assembly are utilized in order to secure the holder to the tree stand.

In addition to these two devices, there are certain patents which disclose holding brackets and related devices for bows, and the following list is an example of such patents.

| Patent No. | Patentee | Issue Date |
| --- | --- | --- |
| 1,865,134 | Plimpton | 6/28/32 |
| 3,179,102 | Peckham | 4/20/65 |
| 3,256,872 | Koser | 6/21/66 |

Plimpton discloses a bracket device for use with a utility pole such that the bracket may be attached to the pole by means of two fasteners and two clearance holes and is further adapted with another pair of holes in order to receive an insulator.

Peckham discloses an attachment blind for archers wherein a pair of clamps are rigidly secured to the attachment blind and may be subsequently secured to the bow such that as the archer draws back on the arrow with the bow in an upright position, the attachment blind is also supported in an upright position and held by the archer.

Koser discloses a stand and stabilizer for archery bows wherein a bracket member is secured to the bow and extending from this bracket member are pair of legs which extend outwardly in order to contact the ground so that the bow may be placed in a free-standing orientation.

With the exception of the Apache bow holder, none of these disclosed bracket and archery devices are associated with the holding of both a bow in combination with the use of a tree stand. What the Apache bow holder does not provide is a one-piece construction which may be either oriented for holding or placed in a storage or transport position such that a plurality of holders can be used on any one tree stand depending upon the positional preference of the hunter and those holders not in use can be conveniently positioned for storage in an out-of-the-way orientation. Another disadvantage of the Apache bow holder is that the clamping means requires a member of sufficient minimum size in order to fit between the wing nut and the adjacent edge of the main body block and thus such a holder may only be applicable to a specifically styled tree stand. Therefore, it would be an advantage to provide a bow holder of a simpler construction which could be utilized in combination with virtually any tree stand and which in addition to positioning the bow in an upright, ready-to-be-used orientation could be stowed out of the way when not in use. The invention disclosed herein overcomes each of these disadvantages as will be apparent from the description which follows.

SUMMARY OF THE INVENTION

A holding device for hunting implements and similar items according to one embodiment of the present invention comprises a main body portion, a pair of oppositely disposed tab portions joined to the main body portion and outwardly extending from a common edge of the main body portion, the common edge and the pair of oppositely disposed tab portions defining an elongated open region and means for attaching the holding device to a structural support member.

One object of the present invention is to provide an improved holding device for hunting implements.

Related objects and advantages of the present invention will be apparent from the following description.

DESCRIPTION OF THE PREFERRED EMBODIMENT

Figure 1:
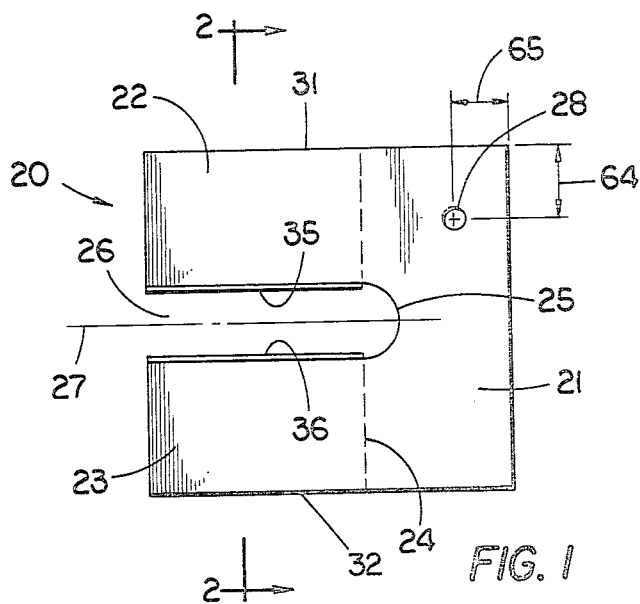
FIG. 1 is a plan view of a holding device for hunting implements according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a holding device 20 for use with hunting implements such as, for example, an archery bow. Although holding device 20 is preferably of a unitary, homogeneous construction, it is possible to describe this holding device as including a main body portion 21 and a pair of oppositely disposed tab portions 22 and 23 which are joined to the main body portion along common edge 24. Since a unitary construction is preferred these various portions are primarily for descriptive purposes and it is to be understood that common edge 24 is in fact an imaginary line and is represented by a broken line in the illustration of FIG. 1. Tab portions 22 and 23 are each substantially rectangular in both lateral and axial cross sections and are substantially parallel to each other as they extend outwardly from line 24. Radiused edge 25 represents a recess into main body portion 21 below common edge 24 and coincides with the innermost extent of open region 26 which is defined by tab portions 23 and 24 on the sides and by radiused edge 25 on the end. Open region 26 is arranged as a slot and the preferred dimensions for use with typical bows is a ⅝ inch width and 2¼ inch length. Centerline 27 represents the centerline of both open region 26 as well as holding device 20 and is coincident with the circular center of radiused edge 25. This centerline is illustrated in order to disclose that mounting hole 28 is in fact not located on centerline 27 and therefore mounting hole 28 is closer to one tab portion than it is to the other tab portion.

Figure 2:
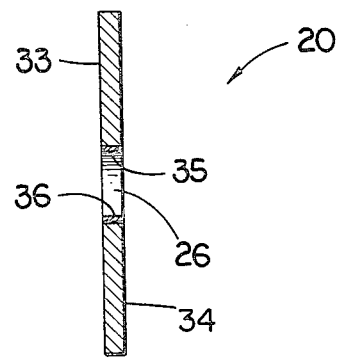
FIG. 2 is a full section view of the FIG. 1 holding device as taken along line 2—2 in FIG. 1.

Since holding device 20 is symmetrical about centerline 27 between edges 31 and 32 with the exception of mounting hole 28, and since it is also symmetrical from top surface 33 to bottom surface 34, the particular side of centerline 27 on which mounting hole 28 is positioned is immaterial. If it is desired to mount the holding device 20 on one side of a tree stand, one orientation is selected, yet if a different tree stand position is desired, a different orientation may be selected while still utilizing the same style holding device and merely inverting or flip-flopping it. The FIG. 2 illustration shows holding device 20 to be substantially flat and in fact the preferred thickness ranges from between ⅛ inch and ⅜ inch, such as, 3/16 inch, T-6 aluminum alloy. In order to provide a protective surface for the bow when it is placed within open region 26 and in order to provide a nonslip surface which holds the bow steady and prevents it from slipping, the straight sides of open region 26, those formed by tab portions 22 and 23 are lined with strips 35 and 36 of vinyl material. While these strips of material may be bonded to their corresponding tab portion edges by a suitable adhesive, it is also anticipated that the entire holding device 20 could be coated with a similar vinyl material or any number of synthetic materials which would provide the desired scratch protection to the bow as it is inserted into open region 26 as well as providing a nonslip surface such that the bow will not shift orientation once positioned. One suitable coating material is a No. 28 plastisol, prime heat cured and then coated again with a No. 65 plastisol coating which is also heat cured. These materials are offered by Industrial Arts Supply Company of St. Louis Park, Minn.

Figure 3:
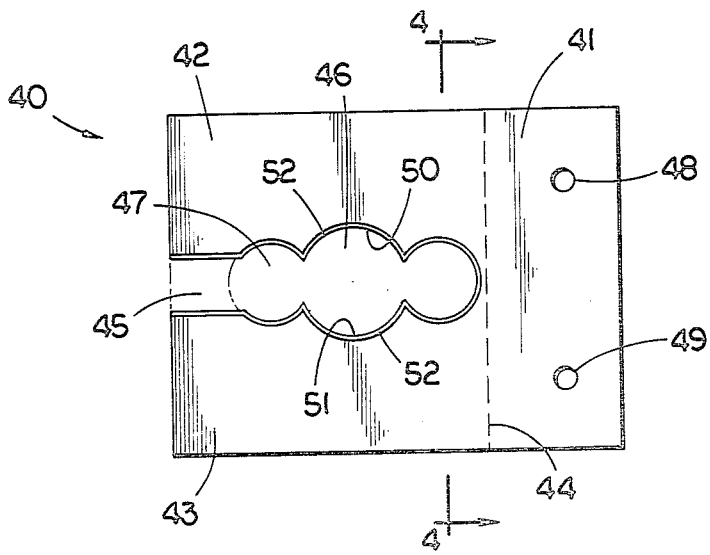
FIG. 3 is a plan view of an alternative holding device for hunting implements according to a typical embodiment of the present invention.
Figure 4:
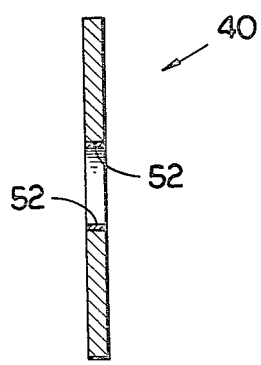
FIG. 4 is a full section view of the FIG. 3 holding device as taken along line 4—4 in FIG. 3.

FIGS. 3 and 4 disclose an alternative to holding device 20 illustrated in FIGS. 1 and 2. Holding device 40 is designed for use with rifles and consequently, the open region is no longer in the form of a slot but rather is arranged as a plurality of holes whose adjacent edges overlap each other such that tab portions 42 and 43 which extend outwardly from main body portion 41 have matching arcuate inner facing edges arranged so as to define open region 46. In order to have holding device 40 correspond to the general description provided for holding device 20, a broken line 44 has also been illustrated which corresponds to the common edge between tab portions 42 and 43 and main body portion 41. Inasmuch as tab portions 22 and 23 of holding device 20 are separate and independent from each other, a corresponding construction for holding device 40 requires that tab portions 42 and 43 be separated. Therefore, notch 45 is provided between tab portion 42, tab portion 43 and circular opening 47 of open region 46. While this enables the two styles of holding device to correspond as to their structural description, it is to be understood that notch 45 could be solid whereby tab portions 42 and 43 would be connected and circular opening 47 would be enclosed. Virtually all other aspects of holding device 40 coincide with those of holding device 20 with the exception that two mounting holes 48 and 49 are provided rather than just one although it is to be understood that a variety of mounting provisions are possible and the disclosure of mounting holes 48 and 49 is merely one suggested arrangement. The matching arcuate inner facing edges 50 and 51 are similarly lined with a vinyl or suitable synthetic material 52 so as to provide a nonslip and nonscratch surface for contact with the barrel of the rifle.

Figure 6:
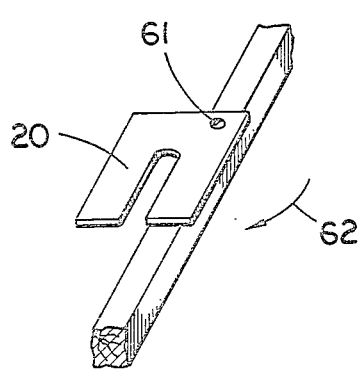
FIG. 6 is a partial perspective view of one of the FIG. 5 holding devices as oriented in a stowed position.
Figure 5:
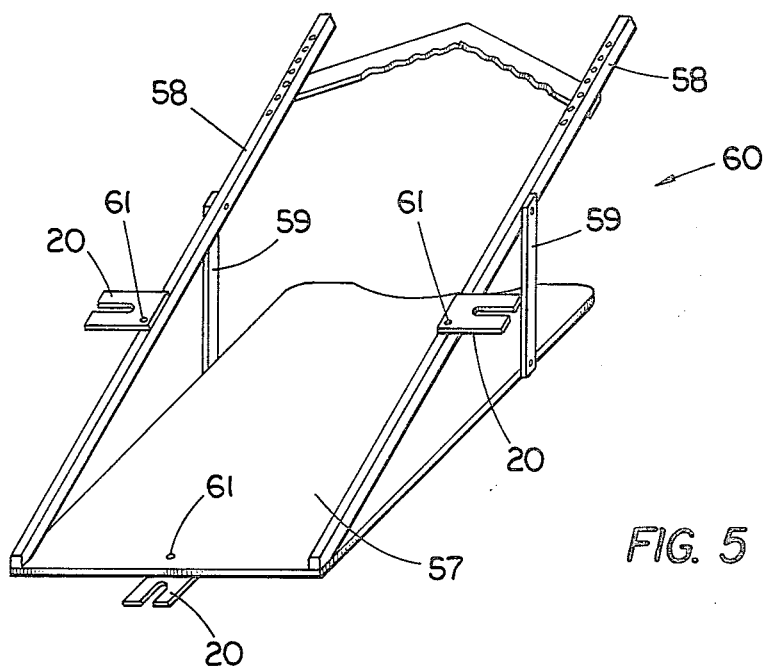
FIG. 5 is a perspective view of a tree stand including a plurality of the FIG. 1 holding devices secured thereto.

Referring to FIG. 5, there is illustrated a conventional tree stand and although full details of the tree stand, its construction and its method of attaching to a tree are not illustrated, such stands are well known in the art and further details are not believed to be necessary to realize an understanding of how the claimed devices are to be utilized in combination with such a tree stand. Tree stand 60 includes a base platform 57, two upwardly inclined side rails 58 and two vertical supports 59. While FIGS. 5 and 6 illustrate holding device 20 in combination with tree stand 60, it is to be understood that holding device 40 could equally well have been illustrated and the description which follows pertaining to the use of holding device 20 in combination with tree stand 60 is to be applicable to holding device 40 as well.

The FIG. 5 illustration discloses three holding devices 20 attached to various structural members of tree stand 60 and these holding devices are secured thereto by means of a threaded fastener 61 which may be a wood screw or bolt or similar device. One holding device 20 is attached to the front edge of platform 47 and the other two holding devices are respectively secured to side rails 58. Although a particular hunter will likely have a preferred location for his bow once he gets positioned on the tree stand, the FIG. 5 illustration shows that a plurality of holding devices as well as a variety of locations may be utilized, depending upon that hunter's personal preference. If two or more bows are to be utilized by the hunter, then each of these may be placed in its respective holding device and will be in an upright position ready to be grasped and used by the hunter. FIG. 6 discloses a stowed or storage position for holding device 20 wherein fastener 61 is utilized as a pivot point and the holding device is pivoted in the direction of arrow 62 until the outer edge of device 20 is substantially flush with the outer edge of side rail 58 of tree stand 60. In order to permit holding device 20 to be flush with the inner edge of side rail 58 when oriented in a ready-for-use condition while still allowing the outer edge to be flush with side rail 58 when in a stowed position, the precise location of mounting hole 28 becomes a factor. Referring again to FIG. 1, dimensions 64 and 65 which represent the edge-to-hole centerline dimensions are selected such that dimension 64 corresponds to the distance between the mounting hole in side rail 58 for fastener 61 and the outer edge of side rail 58 while dimension 65 corresponds to the dimension from the hole in side rail 58 to the inner edge of side rail 58. With the mounting holes in each side rail being centered between the inner and outer edges, it should be apparent that dimensions 64 and 65 are equal to each other in this particular arrangement.

Figure 7:
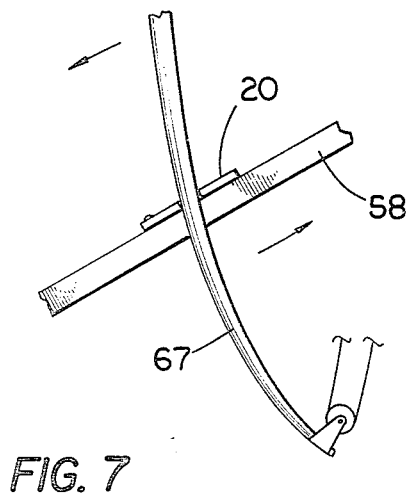
FIG. 7 is a partial side elevation view of a bow held in an upright position by one of the FIG. 5 holding devices.

Referring to FIG. 7, there is a partial side elevation view of one side rail 58 and holding device 20 with a bow placed within holding device 20 and oriented in a substantially upright ready-for-use position. The inclined angle of side rail 58 of tree stand 60 creates a forward-tilting action for bow 67 and in part due to the fact that the bow limb is thicker toward the handlegrip, the bow becomes wedged within open region (slot) 26 of holding device 20 such that the bow remains in this upright position. The arrows denote this tilting forward orientation and it is to be understood that once the bow is called for by the hunter, the hunter merely grasps the upper part of the bow and straightens its orientation to the upright thereby unwedging it from holding device 20 and sliding it out of open region 26. This quick removal of the bow from the holding device enables a very quick as well as quiet pickup of the bow once game has been spotted and it is time for the hunter to load the bow with an arrow and take aim. The vinyl strips 35 and 36, or alternatively, holder coating, which facilitate the nonskid wedging action also enhance the overall quietness of the device such that the bow can be extracted from device 20 without noise and thereby enable the hunter an opportunity to actually take aim and get off a shot before the game is alerted to the hunter's presence and darts away.

Figure 8:
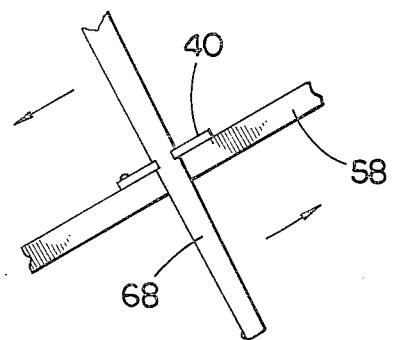
FIG. 8 is a partial side elevation view of a FIG. 3 holding device in combination with a tree stand and receiving a rifle barrel.

FIG. 8 illustrates alternative holding device 40 in combination with one side rail 58 and a rifle 68 inserted into open region 46. The same wedging action occurs with the rifle barel as with the bow with the only difference being that in order to remove the rifle, it must be pulled back through the open region 46 rather than be extracted by sliding it outwardly from the open region. It should also be noted at this point that holding device 40 includes a plurality of circular openings and thus is adaptable to various barrel and rifle styles. However, since notch 45, even if included, does not extend beyond the diameter of circular opening 47, it is not possible to slide the rifle barrel laterally out of the open region 46 and this is why the rifle must be pulled upwardly in order to be removed. The plurality of circular openings also facilitates and provides clearance for the gun sight such that by selective orientation of the rifle an adjacent circular opening may be utilized through which the gun sight can pass as the gun is both inserted as well as extracted from the holding device 40. While a metal construction for holding devices 20 and 40 may be preferred from the standpoint of durability and rigidity, it is envisioned that any number of synthetic materials may be utilized and that these particular holding devices may be molded into their finished shape as a one-step operation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. In combination:
   a tree stand of the style including:
   (a) a substantially flat, horizontally disposed base platform;
   (b) two side rails joined adjacent to the front edge of said base platform and inclined upwardly as they extend beyond the rear edge of said base platform; and
   (c) two vertical supports each joined to a side edge of said base platform between said front edge and said rear edge and to a different one of said side rails; and
   a plurality of holding devices attached to said tree stand for holding hunting implements in a ready-for-use position, each of said holding devices comprising:

(d) a substantially, flat main body portion having a substantially constant thickness throughout;

(e) two tab portions symmetrically disposed on opposite sides of a centerline of said main body portion and joined to said main body portion and outwardly extending from a common edge of said main body portion;

(f) said common edge and said two oppositely disposed tab portions defining an elongated open region centered on said centerline; and (g) clearance aperture means for receipt of an attaching member for securing said holding device to a structural support member.

2. The combination of claim 1 wherein there is at least one holding device attached to each of said two side rails and to the front of said base platform.

3. The combination of claim 1 which further includes a synthetic coating disposed on the facing edges of said pair of oppositely disposed tab portions which define sides of said open region.

4. The combination of claim 3 wherein said oppositely disposed tab portions are substantially rectangular and parallel to each other and said open region is a substantially rectangular slot and wherein said common edge is relieved with a curved recess at a location between said tab portions providing a radiused base to said rectangular slot.

5. The combination of claim 3 wherein said oppositely disposed tab portions have matching arcuate interfacing edges arranged so as to define said open region as a plurality of adjacent circular openings, said openings overlapping each other at adjacent edges.

6. In combination:

a tree stand of the style including:

(a) a substantially flat, horizontally disposed base portion:

(b) two side rails joined adjacent to the front edge of said base platform and inclined upwardly as they extend beyond the rear edge of said base platform;

(c) two vertical supports each joined to a side edge of said base portion between said front edge and said rear edge and to a different one of said side rails; and a plurality of holding devices attached to said tree stand for holding hunting implements in a ready-for-use position, there being at least one holding device attached to each side rail and adjacent the front edge of said base portion, each of holding devices comprising:

(d) a main body portion;

(e) a pair of oppositely disposed tab portions joined to said main body portion and outwardly extending from a common edge of said main body portion;

(f) said common edge and said pair of oppositely disposed tab portions defining an elongated open region, the facing edges of said tab portions defining said open region having a synthetic coating disposed thereon;

(g) means for attaching said holding device to a structural support member, said attaching means including a clearance aperture and a fastener received by said clearance aperture and by said tree stand; and (h) said oppositely disposed tab portions being substantially rectangular and parallel to each other and said open region being a substantially rectangular slot wherein said common edge is relieved with a curved recess at a location between said tab portions thereby providing a radiused base to said rectangular slot.

7. In combination:

a tree stand of the style including:

(a) a substantially flat, horizontally disposed base portion:

(b) two side rails joined adjacent to the front edge of said base platform and inclined upwardly as they extend beyond the rear edge of said base platform;

(c) two vertical supports each joined to a side edge of said base portion between said front edge and said rear edge and to a different one of said side rails; and a plurality of holding devices attached to said tree stand for holding hunting implements in a ready-for-use position, there being at least one holding device attached to each side rail and adjacent the front edge of said base portion, each of holding devices comprising:

(d) a main body portion;

(e) a pair of oppositely disposed tab portions joined to said main body portion and outwardly extending from a common edge of said main body portion;

(f) said common edge and said pair of oppositely disposed tab portions defining an elongated open region, the facing edges of said tab portions defining said open region having a synthetic coating disposed thereon;

(g) means for attaching said holding device to a structural support member, said attaching means including a clearance aperture and a fastener received by said clearance aperture and by said tree stand; and (h) said oppositely disposed tab portions having matching arcuate interfacing edges arranged so as to define said open region as a plurality of adjacent circular openings, said openings overlapping each other at adjacent edges.

* * * * *